Oct. 30, 1923.
A. J. TURNER
1,472,313
KETTLE TOP
Filed Sept. 5, 1922
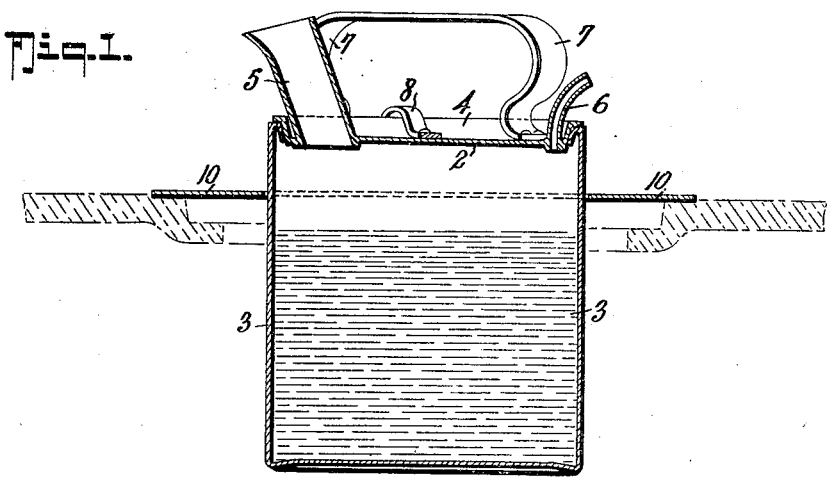
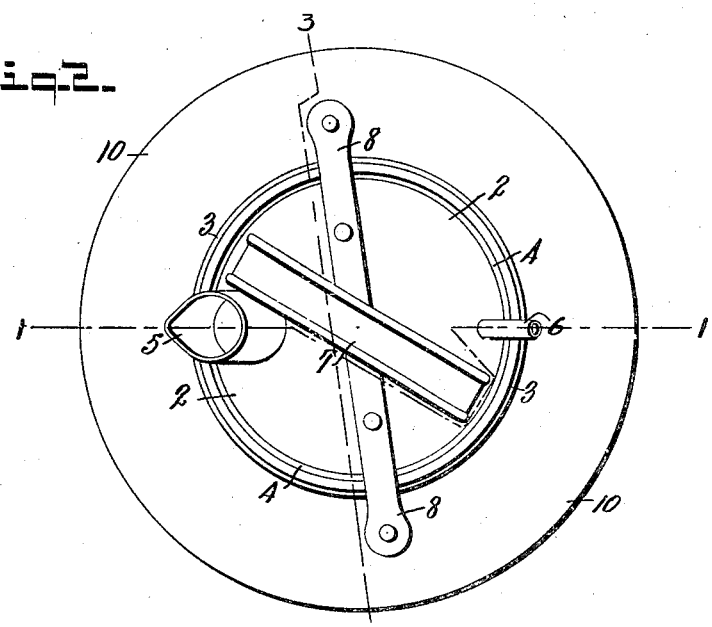
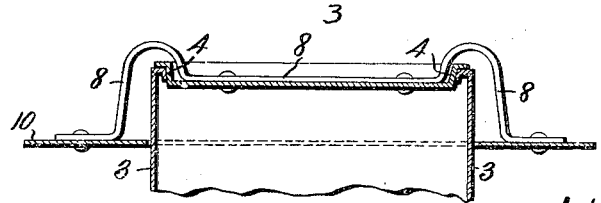
INVENTOR
Arthur J. Turner
BY
Fred G. Dieterich & Co.
ATTORNEYS Patented Oct. 30, 1923.

1,472,313

UNITED STATES PATENT OFFICE.

ARTHUR J. TURNER, OF VANCOUVER, BRITISH COLUMBIA, CANADA.

KETTLE TOP.

Application filed September 5, 1922. Serial No. 586,275.

*To all whom it may concern:*

Be it known that I, ARTHUR J. TURNER, citizen of the Dominion of Canada, residing at Vancouver, in the Province of British Columbia, Canada, have invented certain new and useful Improvements in Kettle Tops, of which the following is a specification.

This invention relates to a top for a kettle, said top particularly designed to removably fit the top aperture of any tin container of that class having a standardized cover, wherein the upwardly turned tapered edge of the cover fits within a downwardly turned tapered edge in the aperture of the container, whereby the kettle top, which is the particular subject of this application, may be applied to any tin container having such standardized cover.

The body or container portion of a tin kettle being exposed to the heat of the fire, rusts away very rapidly, while such parts as the cover, which are not so exposed, have a considerably longer life.

In the device, which is the subject of this application, the handle, the spout and the steam vent tube are permanently secured to and form parts of the circular cover of a standardized container as described, so that this cover provided with handle and spout may be applied to any corresponding container and may therefore be readily renewed from time to time as required.

The invention also comprises other incidental features to which attention is drawn in the following specification, reference being made to the drawings by which it is accompanied, in which:

Fig. 1 is a vertical section of the cover showing its attachment to the container, the section being taken on the line 1—1 in Fig. 2.

Fig. 2 is a plan of the same, and

Fig. 3 is a section of the cover and the upper part of the container on the line 3—3 in Fig. 2 the handle being omitted.

In these drawings 2 represents a cover, the edge of which corresponds in diameter and taper to those of a standardized cover for a container 3, such as is used in retaining various articles of household use, such as syrup, jams and cooking fat (Crisco), and may be one of such covers. The edge of the cover 2 is upwardly turned, as at 4, and tapered to tightly fit within the corresponding downwardly turned tapered edge of the aperture in the top of the container 2.

In this cover 2 is secured a handle 7, a pouring spout 5 and a short vent pipe 6 to provide an exit for the steam or vapour from the boiling water while the liquid is being poured from the spout 5.

The cover 2 having these attached parts is pressed tightly into the seated aperture of any suitable container 3 that may be available and is securely held therein by the frictional grip of the tapered edges. The taper of the can and cover is so slight that it does not appreciably reduce the frictional effect, the frictional grip being sufficient to support the weight of the can 3 and its contents.

When in course of time the body portion 3 becomes rusted or leaks, the cover 2 may be readily removed and applied to another body portion 3 which is generally obtainable by any housekeeper.

To enable the body of the container 3 to be projected within an aperture of a stove, a ring plate 10 is supported concentric with the cover 2 and therefore with the container 3 at a short distance below the top of the container, the ring 10 being secured by a metal strip 8 riveted to the top of the cover, the ends of which strip are upwardly and then downwardly bent, as shown in Fig. 2, and riveted to the upper side of the ring plate 10.

The ring plate thus becomes removable with the cover and will rest on the top plate of a stove supporting the body 3 of the kettle and allowing it to downwardly project into the fire-box or flue, and at the same time the annular space is closed surrounding the body of the kettle in the aperture of the top plate.

The device is an exceedingly convenient one for the reasons heretofore given that the body part of the kettle may be so readily renewed, and is further convenient when camping or picnicking as the container part 3 may be packed with some required article of food or diet, and the top of the kettle only requires to be packed as such.

Having now particularly described my invention, I hereby declare that what I claim as new and desire to be protected in by Letters Patent, is:

1. A kettle cover, comprising the combination with the removable cover of a container, of a pouring spout and handle secured to the cover, and means independent of the body of the container secured to the cover for supporting the same a short distance above the top plate of a stove while the container to which it is attached projects through an aperture therein.

2. In combination, a kettle, a cover fitting the same with retaining friction, a ring encircling the container in a plane below the top of the container, means secured on the cover and secured to said ring, a handle secured to said cover, said cover and ring being removable as a unit from said container said ring serving to sustain said cover and through the cover sustain said kettle.

In testimony whereof, I affix my signature.

ARTHUR J. TURNER.